United States Patent [19]
Bartosiak et al.

[11] Patent Number: 4,647,593
[45] Date of Patent: Mar. 3, 1987

[54] EXPANDABLE POLYPROPYLENE INTERPOLYMER PARTICLES

[75] Inventors: Kristine M. Bartosiak, Newtown Square; Michael W. Knauff, Media, both of Pa.

[73] Assignee: Atlantic Richfield Company, Los Angeles, Calif.

[21] Appl. No.: 869,540

[22] Filed: Jun. 2, 1986

[51] Int. Cl.$^4$ ............................................. C08J 9/18
[52] U.S. Cl. ....................................... 521/60; 521/56; 521/139; 525/322; 525/387; 525/938; 528/503
[58] Field of Search ........................... 521/56, 60, 139; 525/322, 938, 387; 528/503

[56] References Cited

U.S. PATENT DOCUMENTS

| | | |
|---|---|---|
| 3,144,436 | 8/1964 | Greene et al. ................... 525/387 |
| 3,743,611 | 7/1973 | Muroi et al. ...................... 521/60 |
| 3,959,189 | 5/1976 | Kitamori ............................ 521/60 |
| 4,168,353 | 9/1979 | Kitamori ............................ 521/60 |
| 4,303,756 | 12/1981 | Kajimura et al. ................. 521/60 |
| 4,303,757 | 12/1981 | Kajimura et al. ................. 521/60 |
| 4,429,059 | 1/1984 | Ozutsumi et al. ................ 521/60 |

Primary Examiner—Morton Foelak
Attorney, Agent, or Firm—Lewis J. Young

[57] ABSTRACT

A process for producing a polypropylene-polystyrene interpolymer which can be impregnated with a blowing agent and can then be expanded under normal conditions for polystyrene particles to low density, fine cell structure foams. The interpolymer is viscbroken during the polymerization of the styrene. The polypropylene is lubricated prior to formation of the interpolymer. The process forms particles which can be impregnated with blowing agent directly.

11 Claims, No Drawings

EXPANDABLE POLYPROPYLENE INTERPOLYMER PARTICLES

BACKGROUND OF THE INVENTION

The field of the present invention is the production of expandable thermoplastic resin particles which can be expanded under low temperature conditions to form fine cell structure foams of density lower than 2.0 pcf.

Polypropyl particles tend to lose blowing agent rapidly after impregnation. U.S. Pat. No. 4,303,756 describes a process for producing polypropylene-polyvinyl aromatic monomer interpolymers which can be impregnated and retain the blowing agent for sufficient time to allow expansion. However, these interpolymers cannot be foamed at temperature of 100° C. normally used to foam thermoplastic resins. U.S. Pat. No. 3,144,436 teaches to viscbreak polypropylene polymers to lower molecular weight polymers by extruding the polymers with a peroxide in the absence of oxygen.

SUMMARY OF THE INVENTION

I have now found that certain interpolymers of polypropylene and polyvinyl aromatic monomers, when viscbroken to alter the rheological properties during the preparation of the interpolymer in the presence of a lubricant and cell control additive, can be impregnated with a blowing agent to give a product which can be expanded under lower temperature (100° C.) conditions to give low density, fine cell structure foam particles.

DETAILED DESCRIPTION OF THE INVENTION

The process of this invention comprises (a) forming an intimate mixture of (1) a copolymer of propylene and sufficient olefin comonomers to give said copolymer a melting peak of less than 140° C. with (2) a lubricant and cell control agent;

(b) suspending, in an aqueous medium containing 0.01 to 5 percent by weight base on the amount of water of a suitable suspending agent, the intimate mixture from (a) and 0.05 to 2.0 percent by weight based on vinyl aromatic monomer of a catalyst mixture comprising at least one catalyst having a 10-hour ½-life temperature of between about 40° and about 110° C., and a high temperature viscbreaking catalyst having a 10-hour ½-life temperature of between about 115° and about 140° C. in a ratio of between about 1:1 and 1:2; said catalyst mixture being dissolved in vinyl aromatic monomer;

(c) adding to said suspension vinyl aromatic monomer such that the amount of monomer is 35 to 80 percent by weight based on copolymer plus monomer;

(d) heating said suspension to a temperature of about 70° to about 95° C. and maintaining at that temperature to polymerize said monomer in or on said copolymer to form a polypropylene-polyvinyl aromatic monomer interpolymer;

(e) raising the temperature of the suspension to about 130° to about 150° C. and maintaining at that temperature for times sufficient to substantially viscbreak the interpolymer;

(f) cooling said suspension to room temperature, separating the interpolymer, washing with water and drying in air;

(g) impregnating said interpolymer with a blowing agent to give expandable polypropylene-polyvinyl aromatic monomer interpolymer which can be expanded at 100° C. or less to fine cell structure foams of density less than 2.0 pounds per cubic foot.

Prior to the impregnation step (g), the product from step (f) may be reintroduced into the reactor and steps (b) through (f) may be repeated. This is especially desirable to obtain the higher percentages of vinyl aromatic monomer, rather than attempting to put all the monomer into the polypropylene copolymer in a single polymerization.

Particles is used herein to designate beads, pellets, or cominuted pieces.

The propylene copolymer used as base for the interpolymer must contain sufficient olefin comonomers to give said copolymer a melting peak of less than 140° C., preferably less than 130° C.

The olefin comonomers in the propylene copolymer may be ethylene, 1-butene or mixtures thereof. The melting peak is measured by Differential Scanning Calorimeter (DSC) by ASTM method D3418-82 at a heating rate of 20° C./min.

The intimate mixture of polypropylene copolymer and a lubricant and cell control agent is formed by extrusion of a blend of the components. The lubricants may be various polymer additives, waxes, organic halogen flame retardant compounds, amides, amines and esters. Especially useful was ethylene bis-steramide, alone or in conjunction with zinc stearate. The ethylene bis-stearamide (Acrawax-C, sold by Glyco Inc.) is preferably used in amount of from about 2% to about 4% by weight based on interpolymer. Zinc stearate is used in amounts of 0.2–0.4% by weight, if used at all.

The suspending agent system is selected from water soluble high molecular weight materials, e.g., polyvinyl alcohol or methyl cellulose and slightly water soluble inorganic materials, e.g., calcium phosphate or magnesium pyrophosphate. In addition to the slightly water soluble suspending agents, there may be added a modifier such as sodium dodecylbenzene sulfonate. The amount of suspending agent added is 0.01 to 5% by weight based on the amount of water.

The vinyl aromatic monomer used may be styrene, alpha-methylstyrene, nuclear-methylstyrene, p-tert-butylstyrene, chlorostyrene, bromostyrene, and mixtures thereof.

The catalyst mixture comprises free radical catalysts. At least one catalyst having a 10-hour ½-life temperature of between about 40° and about 110° C. is used to polymerize the vinyl aromatic monomer within the polypropylene copolymers. Suitable examples of polymerization catalysts are benzoyl peroxide, lauroyl peroxide, tert-butyl perbenzoate and tert-butyl peracetate. Also used in a high temperature catalyst having a 10-hour ½-life temperature of between about 115° and about 140° C. which is used to viscbreak the polypropylene-polyvinyl aromatic monomer interpolymer. Particularly suitable for this use is dicumyl peroxide. The catalysts are normally used in amounts of 0.05 to 2.0% by weight based on vinyl aromatic monomer in a ratio of polymerization catalysts: viscbreaking catalyst of between about 1:1 to 1:2. The catalysts are dissolved in sufficient vinyl aromatic monomer to give a solution prior to addition to the suspended polypropylene particle.

The vinyl aromatic monomer added to the suspension is absorbed by the copolymer and penetrates into the inside portion of the propylene-ethylene copolymer and is there polymerized in or on the copolymer. The resultant product is referred to herein as an "interpolymer". In this reaction, 20 to 60% by weight of the copolymer and 40 to 80% by weight of the vinyl aromatic monomer are used. When the amount of the vinyl aromatic monomer is less than 40% by weight, the expansion ratio of a resulting foamed structure decreases, and a foamed structure of low density cannot be obtained. Amounts of vinyl aromatic monomer greater than 80%, cause elasticity, thermal stability and oil resistance of the resulting foamed product to deteriorate.

The vinyl aromatic monomer and the polymerization catalysts may be added separately or as a solution of catalyst in the monomer. The two can be added all at once or, preferably in incremental portions to prevent suspension instability. The monomer and catalyst can also be emulsified with suitable emulsifying agent and added to the suspension of copolymer resin as an emulsion.

The polymerization cycle consists of heating the suspension of copolymer, monomer and catalysts to a temperature of about 70°–90° C., holding at this temperature for at least 1 hour, preferably from 1 to 3 hours, to polymerize the bulk of the monomers in the polypropylene copolymer, and then raising the temperature to about 130°–150° C. and holding at this temperature for at least 1 hour, preferably 1–4 hours, to substantially viscbreak the interpolymer to a melt flow (condition L) of at least 10 and polymerize any residual vinyl aromatic monomer in the mixture.

Viscbreaking is the intentional chain scission of polypropylene to produce lower molecular weight, a more narrow molecular weight distribution, a slow crystallization rate and faster molecular relaxation time in the molten state.

Impregnation of the viscbroken interpolymer is accomplished by mixing the interpolymer in water with the blowing agent and a surfactant, such as polyvinyl alcohol, methocel or sodium dodecylbenzene sulfonate. Because the polypropylenes do not retain blowing agents well, the presence of polyvinyl aromatic monomer helps to retain the blowing agents. To ensure the retention of the blowing agents after impregnation, the polymer must be cooled. The materials are normally stored at lower temperatures to prevent loss of blowing agent.

The blowing agents suitable in the impregnation include aliphatic hydrocarbons such as butane, n-pentane, isopentane, n-hexane, and neopentane, cycloaliphatic hydrocarbons such as cyclopentane and halogenated hydrocarbons such as methyl chloride, ethyl chloride, methylene chloride, trichlorofluoromethane, dichlorodifluoromethane, etc. These blowing agents can be used alone or as mixtures of two or more thereof. The preferred amount of the blowing agent is in the range of 5 to 20% by weight based on the weight of the polypropylene-polyvinyl aromatic monomer interpolymer. If desired, a solvent may be used, such as toluene or benzene. The solvent may be used in amounts of 2–6% by weight based on interpolymer.

The present invention is further illustrated in the following Examples in which all parts and percentages are by weight.

EXAMPLE I (a) Addition of lubricant and cell control agent to polypropylene

Polyproplene copolymer particles, containing 4.4% by weight (as reported by manufacturer) of ethylene copolymerized therein, having a M.F. value of 3.80 and a melt peak of 128° C., were blended with 3% by weight of ethylene bis-stearamide as lubricant and cell control agent. The mixture was extruded in a MPM 1½" extruder at about 148° C. through 0.125" die holes into cold water and the strands cut into pellets of M.F. 5.35.

(b) Preparation of Polypropylene-polystyrene Interpolymer

To a 25 gallon reactor was added 200 parts of water, 100 parts of the polypropylene pellets from (a) above, 0.9 part of tricalcium phosphate, 0.04 part of sodium dodecylbenzene sulfonate to form a suspension. The reactor was heated to 91° C. A premix of 0.36 part of benzoyl peroxide as primary catalyst, 0.36 part of tert-butyl perbenzoate as secondary catalysts, and 0.77 part of dicumyl peroxide as viscbreaking catalyst in sufficient stryene to dissolve the catalysts was added to the reactor along with the remainder of 113 parts of styrene. The reactor was maintained at 91° C. for 1.5 hours and then the temperature was raised to 140° C. over 2 hours and maintained at 140° C. for 3 hours. After cooling, the reaction mixture was removed from the reactor, acidified to remove suspending agents, and the particles separated from the aqueous medium, washed with water and air dried. The polypropylene-polystyrene interpolymer thus recovered had a melt flow (condition L) of 22.0 and a polystyrene content of 53% by weight.

(c) Impregnation of Polypropylene-polystryene Interpolymer

The interpolymer pellets from (b) above were impregnated with isopentane by charging to a 25 gallon reactor, 100 parts of interpolymer from (b), 100 parts of water, 0.031 parts of sodium dodecylbenzene sulfonate, 2.5 parts of toluene, and 0.031 part of ethylene bis-stearamide. Over 45 minutes, 15.0 part of isopentane was charged into the suspension of interpolymer. The suspension was then heated to 60° C. over 45 minutes and held at 60° C. for 7 hours. The reactor was cooled and the polymer particles separted from the suspension medium. The final expandable particles were expanded in a 55 gal (Rodman-type) expander at 100° C. In continuous expansion a density of 2.2 pcf was obtained; and in a batch expansion a density of 1.6 pcf was obtained. The foamed particles had very fine cell structure, and were very heat resistant during molding.

EXAMPLE II

The method of Example I was repeated on 4 different base polypropylenes with the changes given below. Sample A was an exact duplicate of the Example I run. Sample B used as base material a copolymer previously viscbroken from a M.F. (condition L) of 6.0 to a M.F. of 17.9. Samples C and D were identically commercially available polypropylene copolymers of M.F. of 4.44 and a melt peak of 129° C. Sample D was extruded with 3% ethylene bis-stearamide; (Acrawax-C) in an NRM 2½" Extruder at about 160° C. through 40 mil die holes to produce small pellets (98% through 12 and on 18 mesh, U.S. Standard Sieve). The results are shown in Table I. All Samples had 53% polystyrene in the final interpolymer.

TABLE I

| Sample No. | A | B | C | D |
|---|---|---|---|---|
| Starting M.F. | 3.8 | 17.9 | 4.44 | 4.44 |
| Extrusion with Acrawax, M.F. | 5.42 | 22.16 | 6.10 | 6.28 |
| Interpolymer, M.F | 27.0 | 22.22 | 35.96 | 26.46 |

TABLE I-continued

| Sample No. | A | B | C | D |
|---|---|---|---|---|
| Batch Pre-expansion, density, p.c.f. | 1.38 | 1.44 | 1.29 | 1.47 |

All samples, except number C, molded well. Sample C expanded readily but did not fuse well. The smaller particle D sample fused well. If is apparent from Sample B that if pre-viscbroken polypropylene is available it works well, but there is no advantage over viscbreaking during the interpolymer formation.

EXAMPLE III

A series of runs was made starting with commerically available polypropylene copolymers of M.F. (condition L) 4.44 and a melt peak of 129° C. As a first processing step, all samples were extruded with 3% Acrawax-C in an NRM Lab 2½" extruder at about 160° C. through 40 mil die holes to produce small pellets (98% through 12 and on 18 mesh, U.S. Standard Sieve) having M.F. of 6.28. In the second processing step (corresponding to Example I (b)) the level of styrene in the feed was adjusted to produce the desired polystryene level in the interpolymers as shown in Table II. Sample E illustrates the use of double interpolymerization to obtain higher percents of polystyrene; in this case 69%. In the double interpolymerization, a first polymerization with about 50% styrene was run, and then a second polymerization was run by reintroducing the interpolymer from the first polymerization with sufficient styrene and peroxides to make up the desired total polystyrene content and again run through the temperature cycle. Sample A was run exactly as in Example I, but densities of less than 2.0 pcf required high temperature expansion using pressurized steam. Sample B was run increasing the toluene charge to 5.0%, but still could not be expanded below 4.5 pcf without pressurized steam. In Sample C, the toluene level was 5.0%, the isopentane level was 20%, and the time of impregnation was increased to 12 hours to obtain product which could be expanded at 100° C. to densities below 2.0 pcf. All results are shown in Table II.

said copolymer a melting peak of less than 140° C. with (2) a lubricant and cell control agent;
(b) suspending, in an aqueous medium containing 0.01 to 5 percent by weight base on the amount of water of a suitable suspending agent, the intimate mixture from (a) and 0.05 to 2.0 percent by weight based on vinyl aromatic monomer of a catalyst mixture comprising at least one catalyst having a 10-hour ½-life temperature of between about 40° and about 110° C., and a high temperature viscbreaking catalyst having a 10-hour ½-life temperature of between about 115° and about 140° C. in a ratio of between about 1:1 and 1:2; said catalyst mixture being dissolved in vinyl aromatic monomer;
(c) adding to said suspension vinyl aromatic monomer such that the amount of monomer is 35 to 80 percent by weight based on copolymer plus monomer;
(d) heating said suspension to a temperature of about 70° to about 95° C. and maintaining at that temperature to polymerize said monomer in or on said copolymer to form a polypropylene-polyvinyl aromatic monomer interpolymer;
(e) raising the temperature of the suspension to about 130° to about 150° C. and maintaining at that temperature for times sufficient to substantially viscbreak the interpolymer;
(f) cooling said suspension to room temperature, separating the interpolymer, washing with water and drying in air;
(g) impregnating said interpolymer with a blowing agent to give expandable polypropylene-polyvinyl aromatic monomer interpolymer which can be expanded at 100° C. or less to fine cell structure foams of density less than 2.0 pounds per cubic foot.

2. The process of claim 1 wherein said impregnation of said interpolymer with a blowing agent comprises the steps of
(a) mixing said interpolymer particles in water with the aid of 0.01–0.5% by weight of sodium dodecylbenzene sulfonate surfactant, 2–6% toluene and 2–4% ethylene bis-stearamide;
(b) slowly adding 5–20% n-pentane;

TABLE II

| Sample No. | A | B | C | D | E |
|---|---|---|---|---|---|
| SECOND PROCESSING STEP | Make Interpolymer w/Peroxide | Make Interpolymer w/Peroxide | Make Interpolymer w/Peroxide | Make Interpolymer w/Peroxide | Double Interpolymer w/Peroxide |
| POLYSTYRENE LEVEL | 43% | 43% | 43% | 53.5% | 69% |
| Melt Flow | 29.46 | 33.66 | 25.68 | 29.69 | 14.32 |
| CHARGE LEVELS, % | | | | | |
| Isopentane | 15 | 15 | 20 | 15 | 15 |
| Toluene | 2.5 | 5.0 | 5.0 | 2.5 | 2.5 |
| Impreg. Cycle, HRS | 7 | 7 | 12 | 7 | 7 |
| TOTAL VOLATILES, % | 15.36 | 15.62 | 17.90 | 15.55 | 15.66 |
| 55 Gallon Pre-expansion, Best Aged Density: | | | | | |
| BATCH | 6.0 | 4.50 | 1.96 | 1.29 | 0.78 |
| CONTINUOUS | — | — | 1.57 | 1.68 | 0.73 |
| COMMENTS/ CONCLUSIONS | 1.45 pcf using pressurized steam expansion | | | | |

What is claimed is:

1. A process for producing expandable polypropylene particles comprising:
   (a) forming an intimate mixture of (1) a copolymer of propylene and sufficient olefin comonomers to give (c) heating the mixture to 60° C.;
(d) holding the temperature of the mixture at 60° for at least about 7 hours;
(e) cooling the mixture, and separating the particles from the aqueous medium by centrifugation and washing with water.

3. The process of claim 1 wherein said olefin comonomer may be ethylene.

4. The process of claim 1 wherein said olefin comonomer may be ethylene and butene.

5. The process of claim 1 wherein said vinyl aromatic monomer is at least one monomer selected from the group consisting of styrene, alpha-methylstyrene, nuclear-methylstyrene, p-tert-butylstyrene, chlorostyrene, bromostyrene, and mixtures thereof.

6. the process of claim 1 wherein said lubricant and cell control agent is 2–4% by weight ethylene-bis-stearamide based on interpolymer.

7. The process of claim 1 wherein said lubricant and cell control agent is 2–4% by weight ethylene-bis-stearamide and 0.2–0.4% by weight zinc stearate based on interpolymer.

8. The process of claim 1 wherein said blowing agent is selected from the group consisting of aliphatic hydrocarbons, cycloaliphatic hydrocarbons, and halogenated hydrocarbons.

9. The process of claim 1 wherein said suitable suspending agent comprises tricalcium phosphate and sodium dodecylbenzene sulfonate.

10. The process of claim 1 wherein said mixture of catalysts consists of benzoyl peroxide, tert-butyl perbenzoate, and dicumyl peroxide in a ratio of about 1:1:2.

11. The process of claim 1 wherein after step (f), said steps (b) through (f) may be repeated before impregnation.

* * * * *